United States Patent
Hall

(10) Patent No.: US 9,440,667 B1
(45) Date of Patent: Sep. 13, 2016

(54) FOOD SERVICE INDUSTRY DOCKING STATION SYSTEM

(71) Applicant: M & E Manufacturing Co., Inc., Kingston, NY (US)

(72) Inventor: Donald M. Hall, Mt. Sinai, NY (US)

(73) Assignee: M & E Manufacturing Company, Inc., Kingston, NY (US)

( * ) Notice: Subject to any disclaimer, the term of this patent is extended or adjusted under 35 U.S.C. 154(b) by 0 days.

(21) Appl. No.: 14/313,730

(22) Filed: Jun. 24, 2014

Related U.S. Application Data

(60) Provisional application No. 61/838,644, filed on Jun. 24, 2013.

(51) Int. Cl.
*B62B 3/10* (2006.01)
*B62B 3/02* (2006.01)

(52) U.S. Cl.
CPC .. *B62B 3/02* (2013.01); *B62B 3/10* (2013.01)

(58) Field of Classification Search
CPC ................. A01D 2101/00; B62B 2202/406
USPC .............................................. 280/47.19, 43
See application file for complete search history.

(56) References Cited

U.S. PATENT DOCUMENTS

| | | | |
|---|---|---|---|
| 5,386,787 A | 2/1995 | Hall | |
| 5,406,777 A * | 4/1995 | Porto | .............. 53/513 |
| 5,456,191 A | 10/1995 | Hall | |
| 5,471,922 A | 12/1995 | Hall | |
| 5,503,087 A | 4/1996 | Hall | |
| 5,628,522 A | 5/1997 | Hall | |
| 5,957,309 A | 9/1999 | Hall | |
| 6,032,574 A * | 3/2000 | Brayton | ............ E04H 5/02 99/486 |
| 6,062,401 A | 5/2000 | Hall | |
| 6,149,120 A | 11/2000 | Hall | |
| 6,322,180 B1 | 11/2001 | Hall | |
| 6,366,313 B1 | 4/2002 | Hall | |
| 6,419,098 B1 | 7/2002 | Hall | |
| 6,474,757 B2 | 11/2002 | Hall | |
| D480,528 S | 10/2003 | Hall | |
| D481,513 S | 10/2003 | Hall | |
| 6,974,042 B2 | 12/2005 | Hall | |
| 7,419,063 B1 | 9/2008 | Hall | |
| 8,602,426 B2 * | 12/2013 | Long | ............ B62B 5/064 280/33.997 |
| 2002/0162813 A1 | 11/2002 | Hall | |
| 2002/0175134 A1 | 11/2002 | Hall | |
| 2003/0127815 A1 | 7/2003 | Hall | |
| 2004/0175290 A1 * | 9/2004 | Scheir | ............ A63L 3/28 422/24 |
| 2005/0212233 A1 | 9/2005 | Hall | |
| 2013/0206904 A1 * | 8/2013 | Gee et al. | .......... 244/118.5 |

* cited by examiner

*Primary Examiner* — John Walters
*Assistant Examiner* — James Triggs
(74) *Attorney, Agent, or Firm* — Shlesinger, Arkwright & Garvey LLP

(57) ABSTRACT

A modular food service equipment system includes an equipment docking station configured for receiving and docking a piece of food service equipment. The docking station further includes a work table having a work surface on an upper face of it. The docking station also includes a docking unit configured for receiving a piece of food service equipment inside of it. The modular food service equipment system may likewise include that the docking unit is provided adjacent to the work surface.

15 Claims, 12 Drawing Sheets

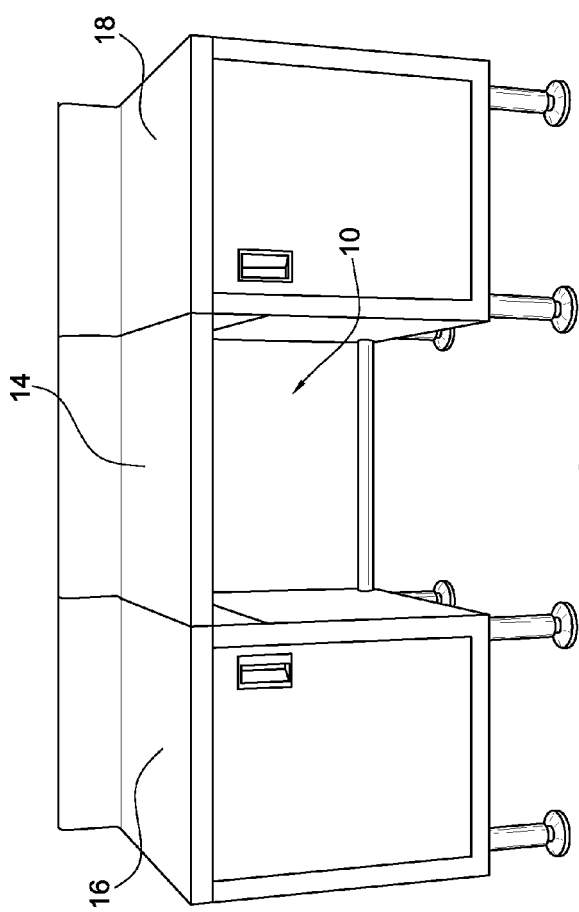
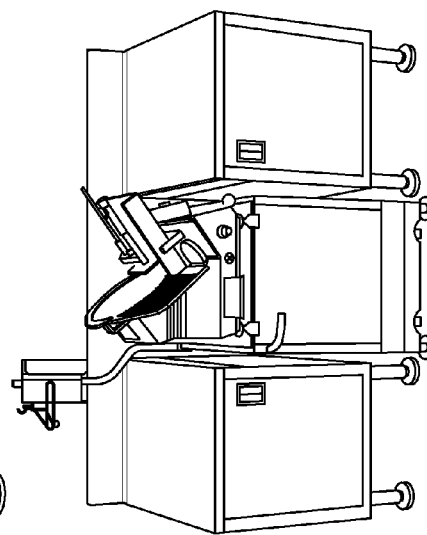
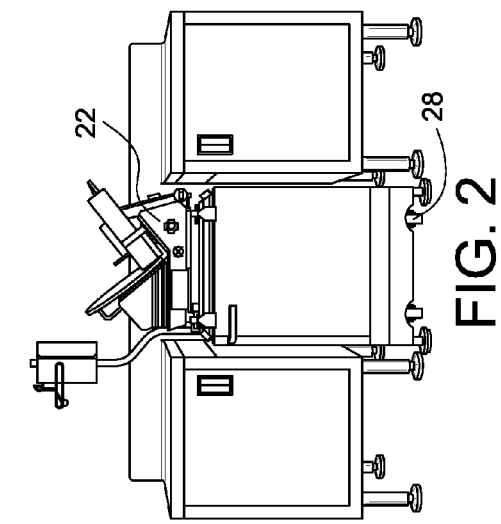

FOOD SERVICE INDUSTRY DOCKING STATION SYSTEM

CROSS-REFERENCE TO RELATED APPLICATIONS

This application claims benefit of application No. 61/838,644, filed Jun. 24, 2013, which is incorporated herein by reference.

FIELD OF THE INVENTION

The invention relates to food service industry docking station systems. More particularly, the invention relates to food service docking station systems including a docking station, and a piece of food service equipment which may be docked in the docking station. It will be understood that food service includes restaurants, hospitals, cafeterias, dormitories, and the like.

For convenience, the term delicatessen and deli, for example are used throughout to refer to the food service industry.

Even more particularly, the invention relates to food service docking station systems including a docking station, and a piece of equipment, such as delicatessen equipment which may be docked in the docking station, such as a movably mounted slicer.

BACKGROUND OF THE INVENTION

Delicatessen equipment, such as slicers, racks, stainless steel work surfaces, and delicatessen cases are known.

Working surfaces with integral shelves and doors are known.

Sliding slicer rails for supporting delicatessen equipment, such as meat and cheese slicers are known. See for example U.S. Pat. No. 6,322,180 to Hall. Freely movable and lockable delicatessen equipment mounting racks with which a butcher can use a piece of delicatessen equipment and face customers, in use in a grocery store or delicatessen, for example are known. Adjustable counterweighted manual lift tables are known. See, e.g. U.S. Pat. No. 5,456,191 to Hall.

There is a need for a delicatessen docking station system for docking and releasing one or more pieces of delicatessen equipment.

OBJECTS AND SUMMARY OF THE INVENTION

It is an object of the invention to overcome the drawbacks of the prior art. It is a further object of the invention to provide a more user friendly and ergonomically suitable delicatessen and grocery store work environment.

It is another object of the invention to provide a delicatessen equipment docking system in which a piece of delicatessen equipment can be locked for use by a meat cutter, for example, in a first position, and with which the piece of delicatessen equipment may be easily undocked, such as released, and moved to a different orientation or position by the meat cutter.

BRIEF DESCRIPTION OF THE DRAWINGS

FIG. 1 shows a first embodiment of deli docking station according to the invention for use in conjunction with the deli docking station system according to the invention.

FIG. 2 shows a piece of delicatessen equipment, such as a meat slicer 22 shown on top of a movable cart including wheels 26 which may or may not sit on the ground, in use, FIG. 3 shows equipment 22 as it is entering docking port 10.

FIG. 4 shows the undocked position of a piece of further delicatessen equipment 32 on a movable cart or storage system, and an empty; i.e. open docking port 40 for receiving delicatessen equipment 32.

DETAILED DESCRIPTION OF THE INVENTION

Figure 4:
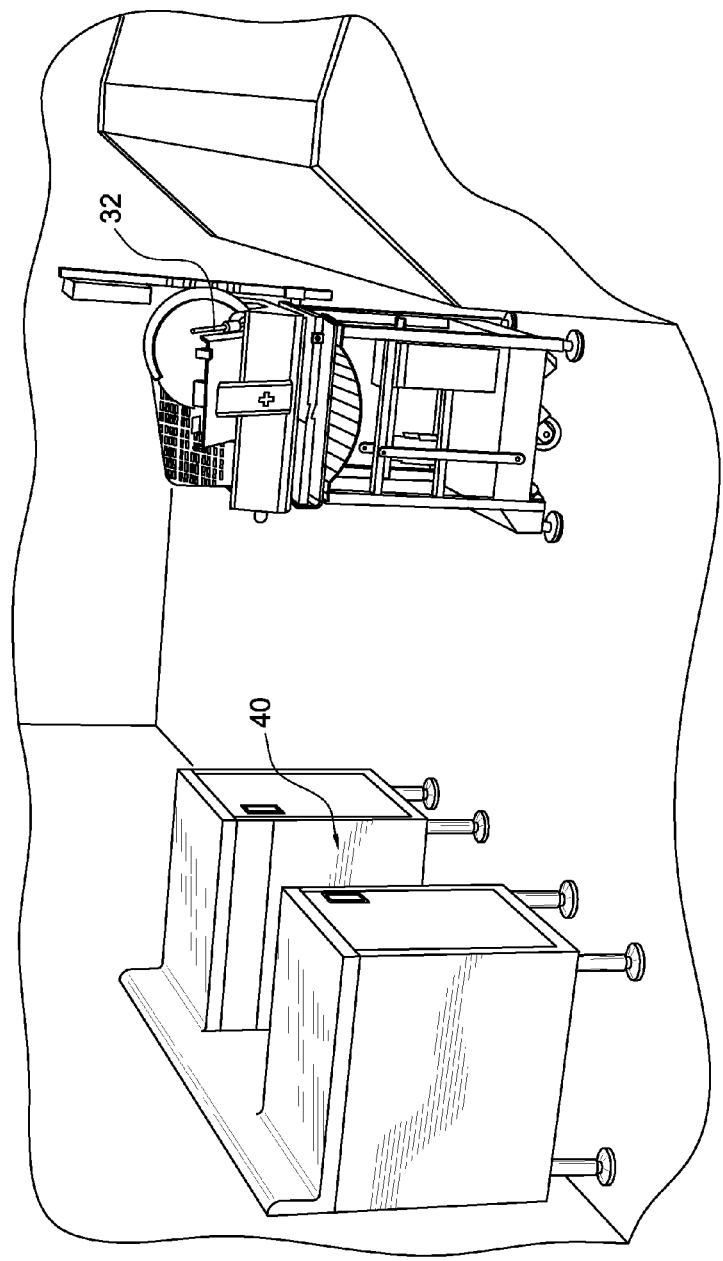
FIG. 4 shows a further embodiment of a deli docking station according to the invention.

FIG. 1 shows a deli docking station for use in conjunction with the deli docking station system according to the invention. The deli docking station may include an opening for receiving a separate piece of delicatessen equipment. The opening 10 may likewise be termed the docking port 10.

A work surface 14 may be provided above docking port 10. Further, a left work surface 16 and a right work surface 18 may be provided above respective left and right cabinets, shown with closed doors, as will be readily appreciated. Work surface 14, when not in use, may be slid under or into one or both of work surfaces 16 and 18, respectively. The work surfaces 16 and 18 may be horizontal work surfaces, as shown, or vertical work surfaces, depending on the intended use.

FIG. 2 shows a piece of delicatessen equipment, such as a meat slicer 22 shown on top of a movable cart including feet 26 which sit on the ground, in use, and which may be lifted off the ground by rollers, such as retractable rollers or wheels 28 shown in PRIOR ART FIG. 5 below.

FIG. 3 shows equipment 22 as it is entering docking port 10.

FIG. 4 shows a further embodiment of a deli docking station according to the invention. FIG. 4 shows the undocked position of a piece of further delicatessen equipment 32 on a movable cart or storage system, and an empty; i.e. open docking port 40 for receiving delicatessen equipment 32. Deli equipment 32 may have four (4) or six (6) wheels, as shown.

Figure 5:
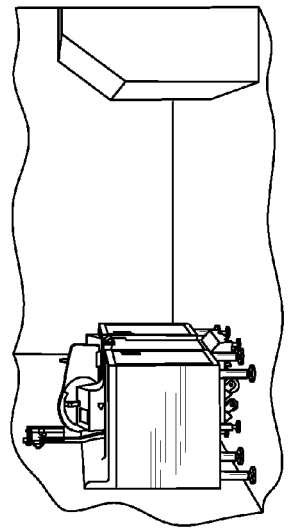
FIG. 5 shows the embodiment of FIG. 4 with delicatessen equipment docked in the docking port 40.

FIG. 5 shows the embodiment of FIG. 4 with delicatessen docked in the docking port 40. Deli docking station of the FIG. 4 embodiment has no built-in middle work surface, as shown. It will be appreciated that a detachably attached removable one may be provided as in the embodiment of FIG. 1.

Figure 6:
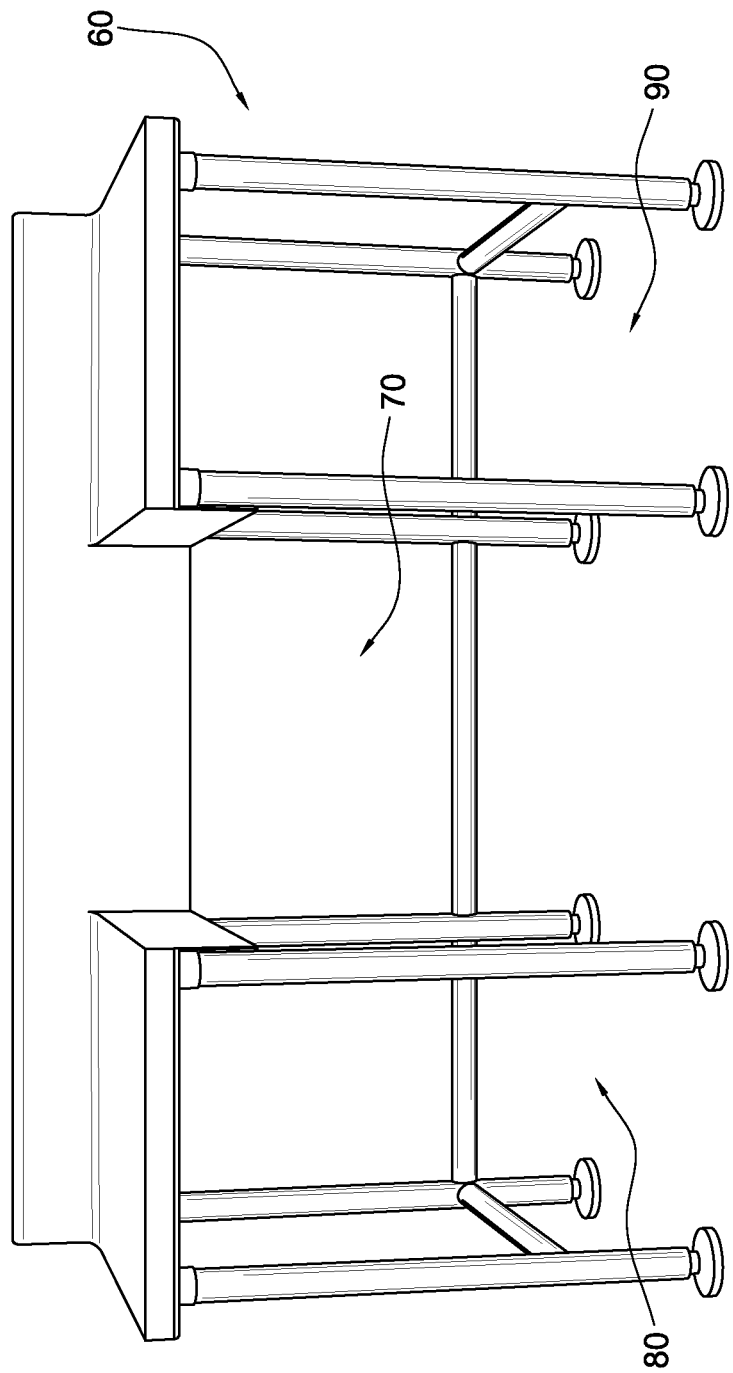
FIG. 6 shows a still further embodiment of a docking station 60 which includes an open docking port 70 and is provided free of a central work surface, as shown.

FIG. 6 shows a still further docking station 60 which includes an open docking port 70 and is provided free of a central work surface, as shown. Further, it will be appreciated that there is a left docking port 80 and a right docking port 90, each of which may include a respective piece of delicatessen equipment. It will be thus appreciated that at least three separate pieces of unillustrated delicatessen equipment could be docked in each one of docking ports 70, 80, and 90, in use.

Figure 7:
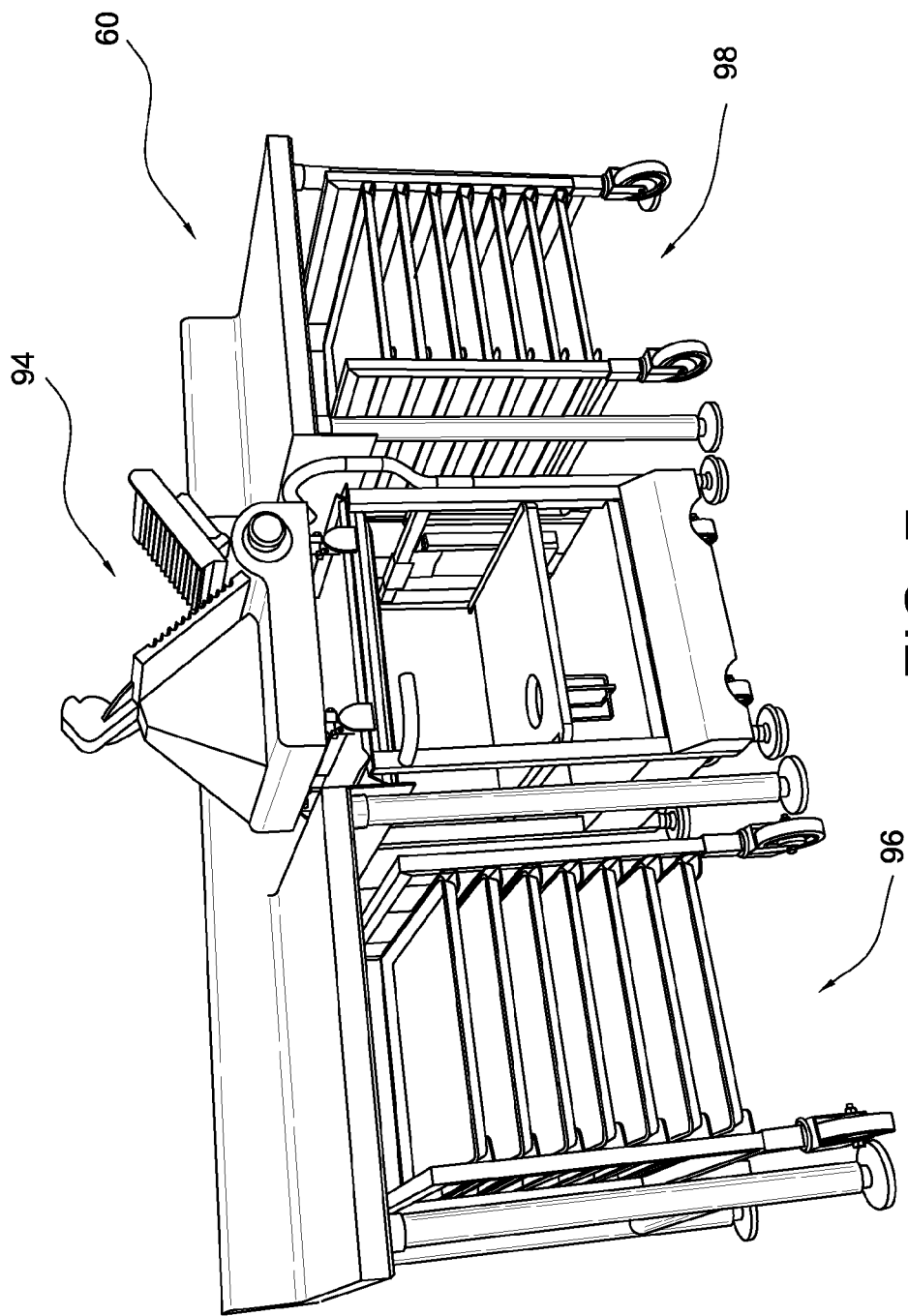
FIG. 7 shows docking system 60 of the FIG. 6 embodiment with a piece of delicatessen equipment 94 docked therein.

FIG. 7 shows docking system 60 of the FIG. 6 embodiment with a piece of delicatessen equipment 94 docked therein.

Figure 8B:
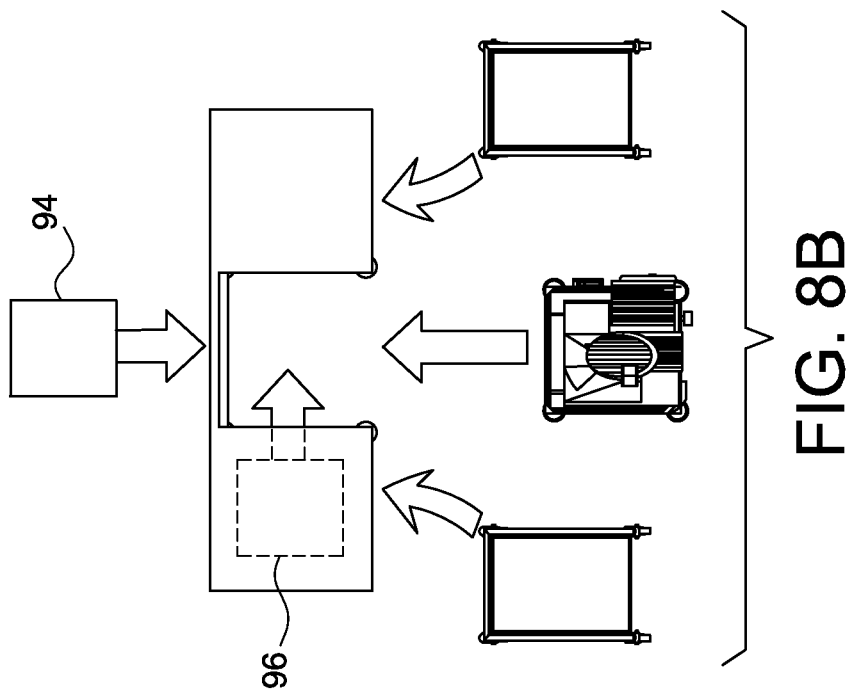
FIG. 8B shows a position in which equipment 96 and 94 are in the process of being docked from different directions from the directions shown in FIG. 8A.
Figure 8A:
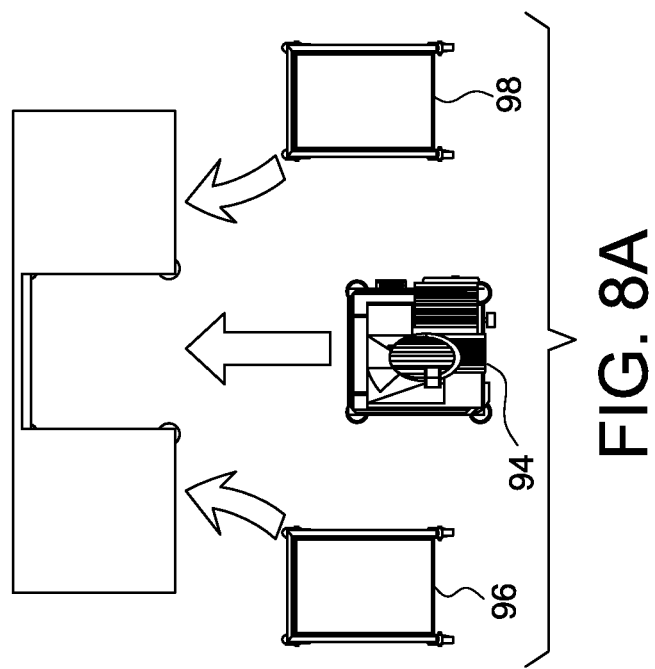
FIG. 8A shows a top view of FIG. 7 in a position in which the delicatessen equipment 96, 94, and 98 are in the process of being docked as shown by the schematic arrows therein.

FIG. 8A shows a position in which the delicatessen equipment 96, 94, and 98 of the FIG. 6 embodiment are in the process of being docked as shown by the schematic arrows therein.

FIG. 8B shows a position in which the delicatessen equipment 96 and 94 of the FIG. 6 embodiment are in the process of being docked from different directions from the directions shown in FIG. 8A, as shown by the schematic arrows therein.

Figure 9:
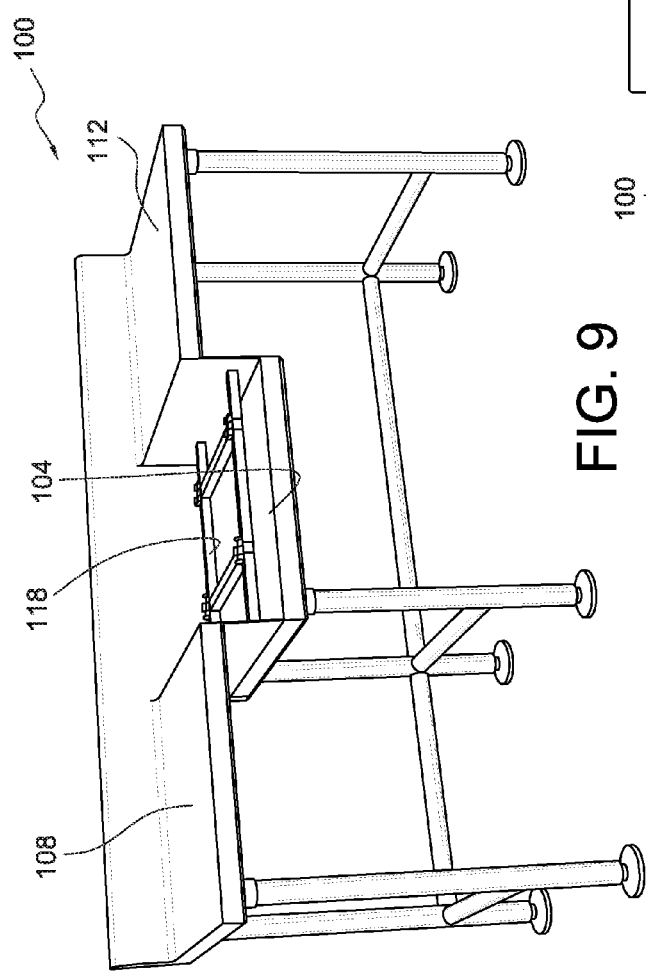
FIG. 9 shows a still further embodiment of a docking system 100 according to the invention which may be termed a catering prep (i.e. preparation) station.

FIG. 9 shows a still further embodiment of a docking system according to the invention which may be termed a catering prep (i.e. preparation) station. This station 100 may have a middle work surface 104 which is positioned at a lower height than left and right work surfaces 108 and 112. As shown, there may be a bracket 118 configured for receiving a piece of delicatessen equipment thereon.

Figure 10:
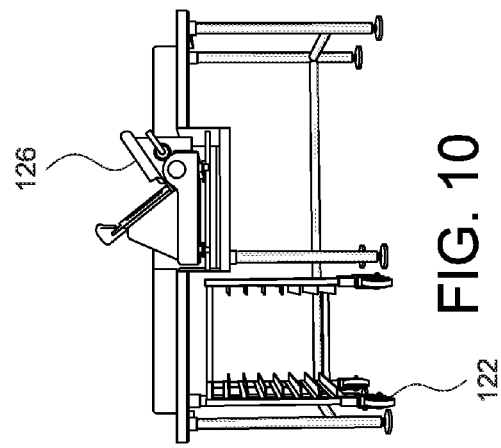
FIG. 10 shows docking station 100 of FIG. 9 in use with a piece of delicatessen equipment 122 under docking station 100 and a piece of deli equipment 126 on top of docking station 100.

FIG. 10 shows docking station 100 in use with a piece of delicatessen equipment 122 docked in the left side thereof and further piece of delicatessen equipment 126 docked on top of rack 118 above work surface 104.

Figure 11:
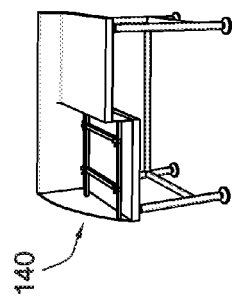
FIG. 11 shows a still further embodiment of a docking system 140 according to the invention.

FIG. 11 shows a still further embodiment of a docking system 140 in which there are only two work surfaces, which may be provided at different heights, as shown, as well as an open docking station thereunder.

Figure 12:
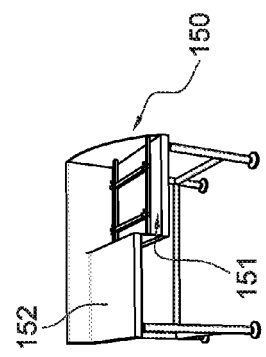
FIG. 12 shows another embodiment of a delicatessen docking system 150 having two work surfaces, the right work surface of which is at a height lower than the left work surface.

FIG. 12 shows a still further embodiment of a delicatessen docking system 150 having two work surfaces 151, 152, respectively, a right work surface 151 of which is at a height lower than a left work surface 152. Docking station or a catering prep station 150 may likewise receive one or two pieces of delicatessen equipment, such as a removable rack thereunder as well as a further piece of delicatessen equipment, such as equipment 126 on a respective illustrated rack as will be readily appreciated.

Figure 13:
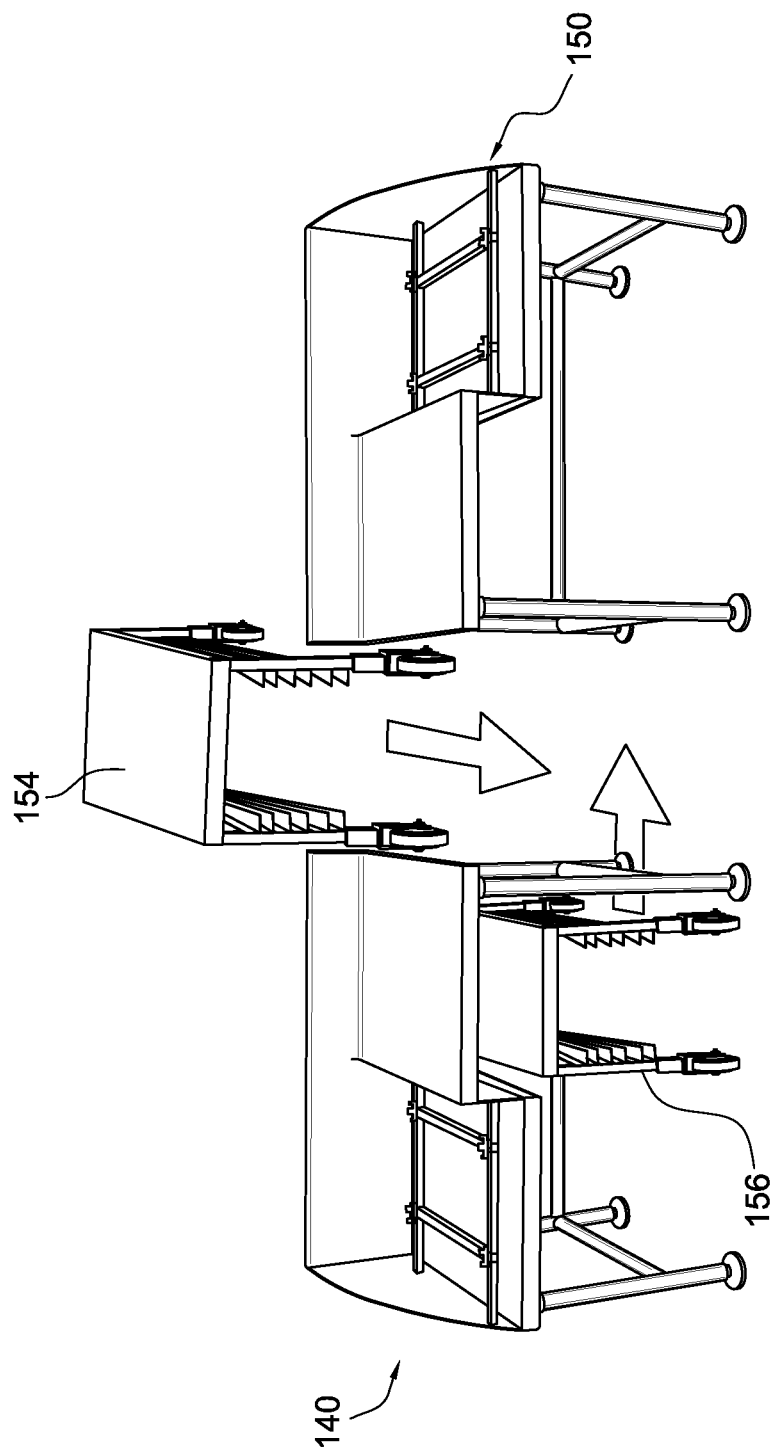
FIG. 13 shows a still further use of the embodiments of a docking system 140 as shown in FIGS. 11 and 12, and in which pieces of equipment 154 and 156 are being docked in different directions.

FIG. 13 shows a still further use of the embodiments of a docking system 140 as shown in FIGS. 11 and 12, and in which pieces of equipment 154 and 156 are being docked in different directions, as shown by the schematic directional arrows therein.

It will be appreciated that equipment 154 could be docked from the "rear" as shown, or from the opposite direction which may be considered from the "front." Further, equipment 156 could be docked before or after the docking of equipment 154, depending on the size and configurations of the two pieces of equipment 154 and 156. For example, as shown, equipment 156 is shorter than 154, and equipment 154 has an open construction. Thus, 154 could be docked, as shown, and would assume a position in between left docking system 140 and right docking system 150. Then, equipment 156 could be moved to right as shown by the directional arrow and end up underneath equipment 154. Alternatively, equipment 154 could remain in place, undocked, and be docked after 156 has been moved to the right and into position between systems 140 and 150. Still further, equipment 154 could remain in place, undocked, and 156 could be moved to the right and into position between systems 140 and 150, and then moved still further to the right so that it comes to a final stationary position docked under right docking system 150.

The above are merely examples of the docking systems and method of docking food industry equipment in accordance with the invention as will be readily appreciated.

Figure 14:
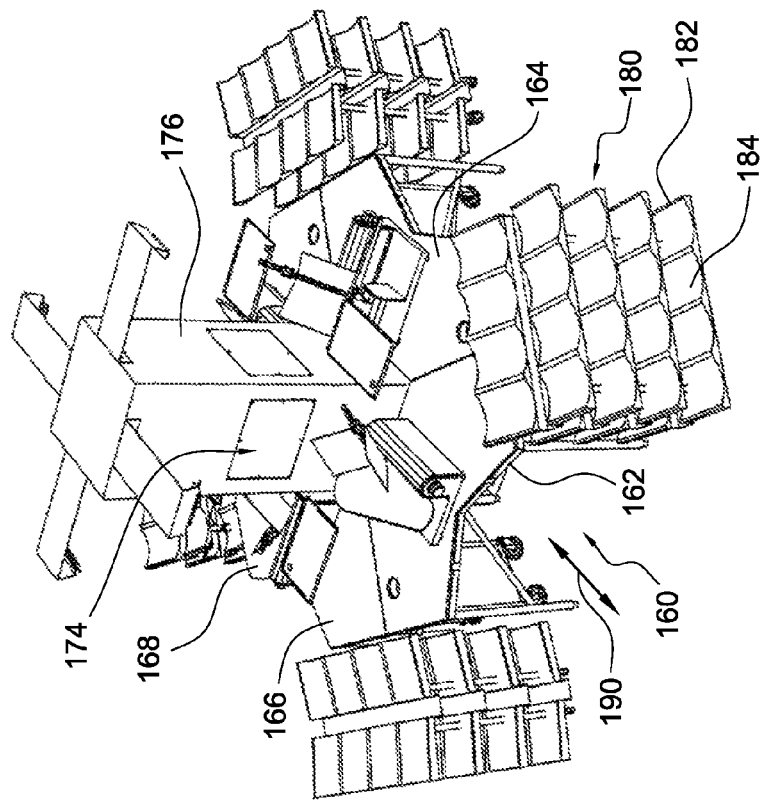
FIG. 14 shows another embodiment of the docking system according to the invention that includes a work station which may be used in a standing or sitting position, and an order screen for the user in front of the work station, and four work stations in a cell which may be used by four workers at one time.

FIG. 14 illustrates another embodiment of a docking system 160 that may include one or more individual respective first, second, third, and fourth work stations 162, 164, 166, and 168, shown arranged in what may be termed a work cell, the work stations shown provided removably secured adjacent and facing each other as shown for reducing the footprint of docking station system 160. As shown, a display screen 174 may be provided at one or more of docking stations 162, 164, 166, or 168 for use by the operator. Display screen 174 may be provided with information on the screen to show the user what product is to be made and, as will be readily appreciated, may be provided a waterproof order screen on which the user may receive orders to be filled, as well as enter information to be provided to other operators or to the system, such as to confirm that the order is complete. As shown display screen may be mounted on a console 176, and a computer including a data processor may be provided inside console 176, for example, or at another distant location, as will be readily understood. Display screen 174 provided at each one of the equipment docking station 162 and further equipment docking station 164, for example, may each be respectively operatively connected to the data processor in console 176 for transmitting and receiving data, so that food preparation data can be received and sent by each user using the display screen on the respective equipment docking station and the further equipment docking station. In brief, each may be termed a respective first, second, third, and fourth equipment docking station.

Further, one or more product racks 180, which may likewise be movably secured adjacent and in docking system 160, may be provided. Each rack 180 may be provided with one or more shelving layers 182, as shown, as well as with one or more individual product loading or receiving shelf storage spaces 184. One or more of docking stations 162, 164, 166, or 168 may be moved in or out of a docking position with docking station system 160. This may be understood with reference to docking station 162 and a double-headed arrow 190 which shows the directions in which docking station 160 may be moved toward and away from its illustrated docking position.

Figure 15:
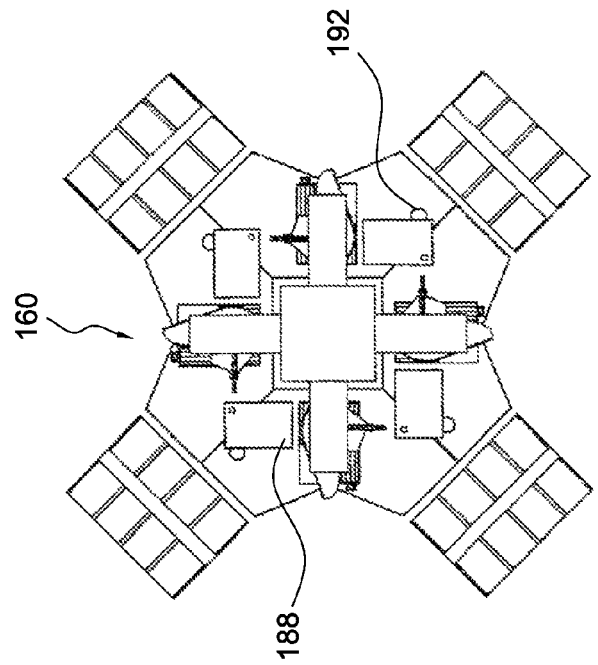
FIG. 15 is a top view of the embodiment of FIG. 14.

FIG. 15 illustrates a top view of docking station system 160 and in which a product weighing scale 188 may be seen from above, as well as a trash or waste discard chute 192 as shown.

Figure 16:
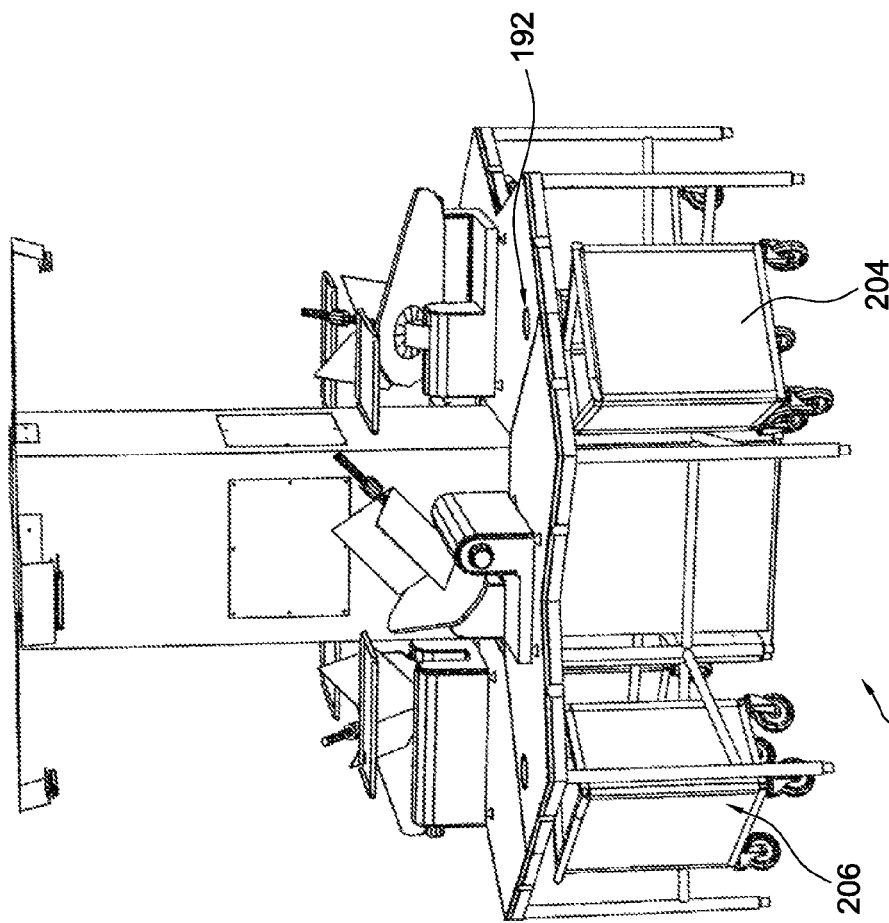
FIG. 16 shows yet another embodiment of a work station according to the invention in which one to four users may use the work station at the same time.

FIG. 16 shows another docking station system 200 according to the invention. Docking station 200 may be similar to docking station 160, and may be further provided with one or more detachably dockable waste receptacles 204 and 206. In this embodiment, trash or waste chute 192 may be used in cooperation with a properly placed, docked, and secured, if desired, waste receptacle 204, as will be readily understood by a person having ordinary skill in the art.

Figure 17:
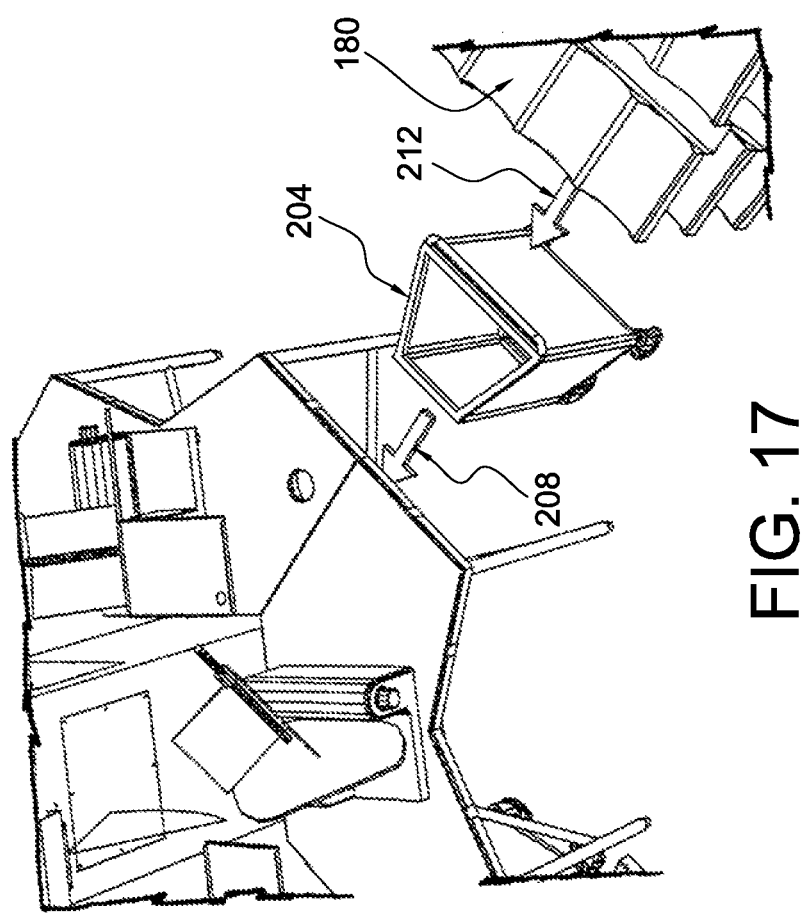
FIG. 17 is another view of the embodiment of FIG. 16 in which a piece of equipment, such as the illustrated waste cart, may be docked under a pair of work stations and another piece of equipment, such as a rack, may be docked adjacent thereto.

FIG. 17 is another view of the embodiment of FIG. 16 in which a piece of delicatessen equipment, such as waste cart 204, is shown as it is being moved in the direction of arrow 208. Further, movable, lockable, rack 180 may subsequently be moved into place adjacent work station 200 and, indeed, adjacent waste container 204, as is shown by rack 180 moving in the direction of arrow 212.

Figure 18:
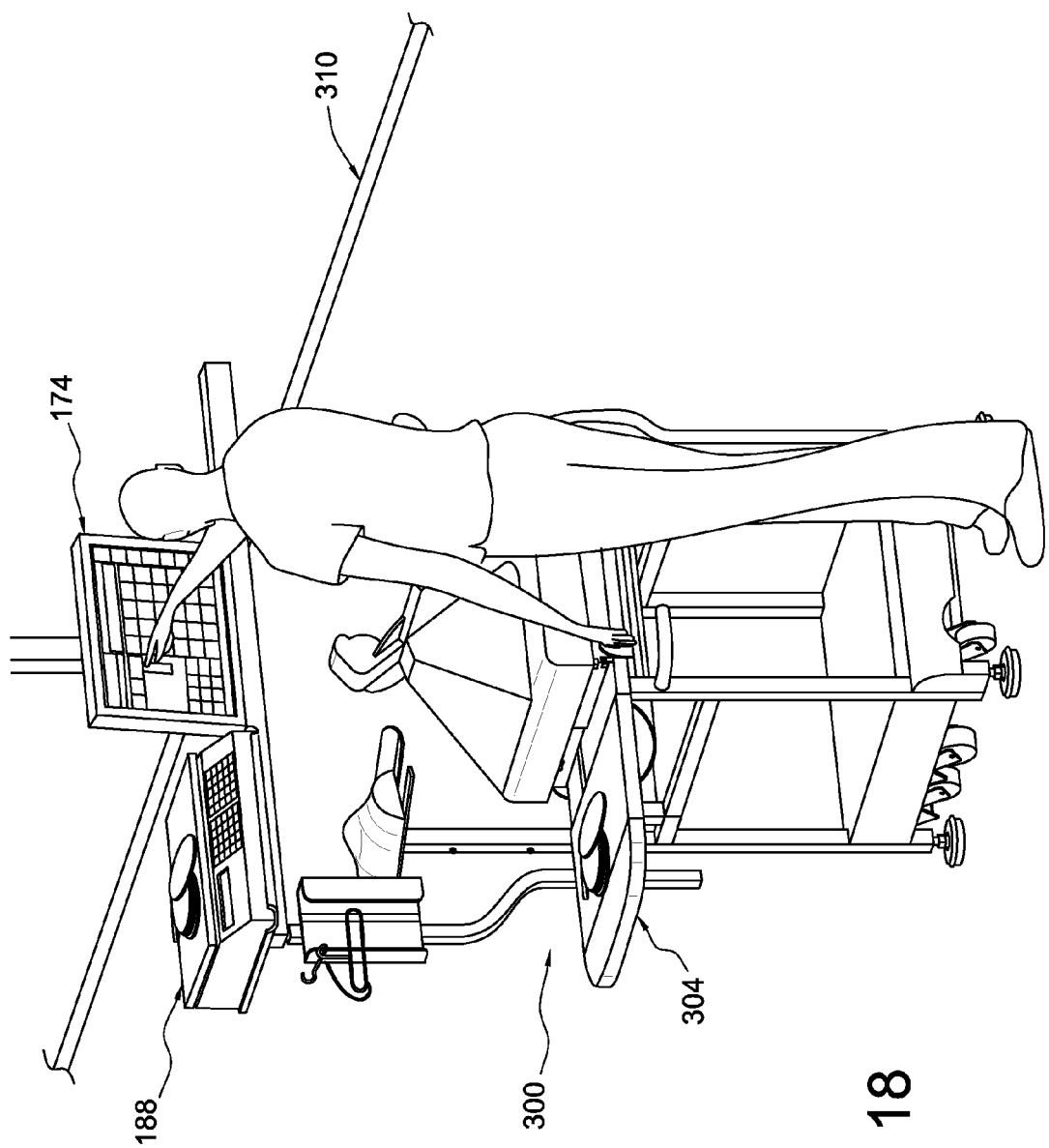
FIG. 18 shows an embodiment of a single work station, as used in a standing position, with a deli wrap station, scale, and order screen.
Figure 19:
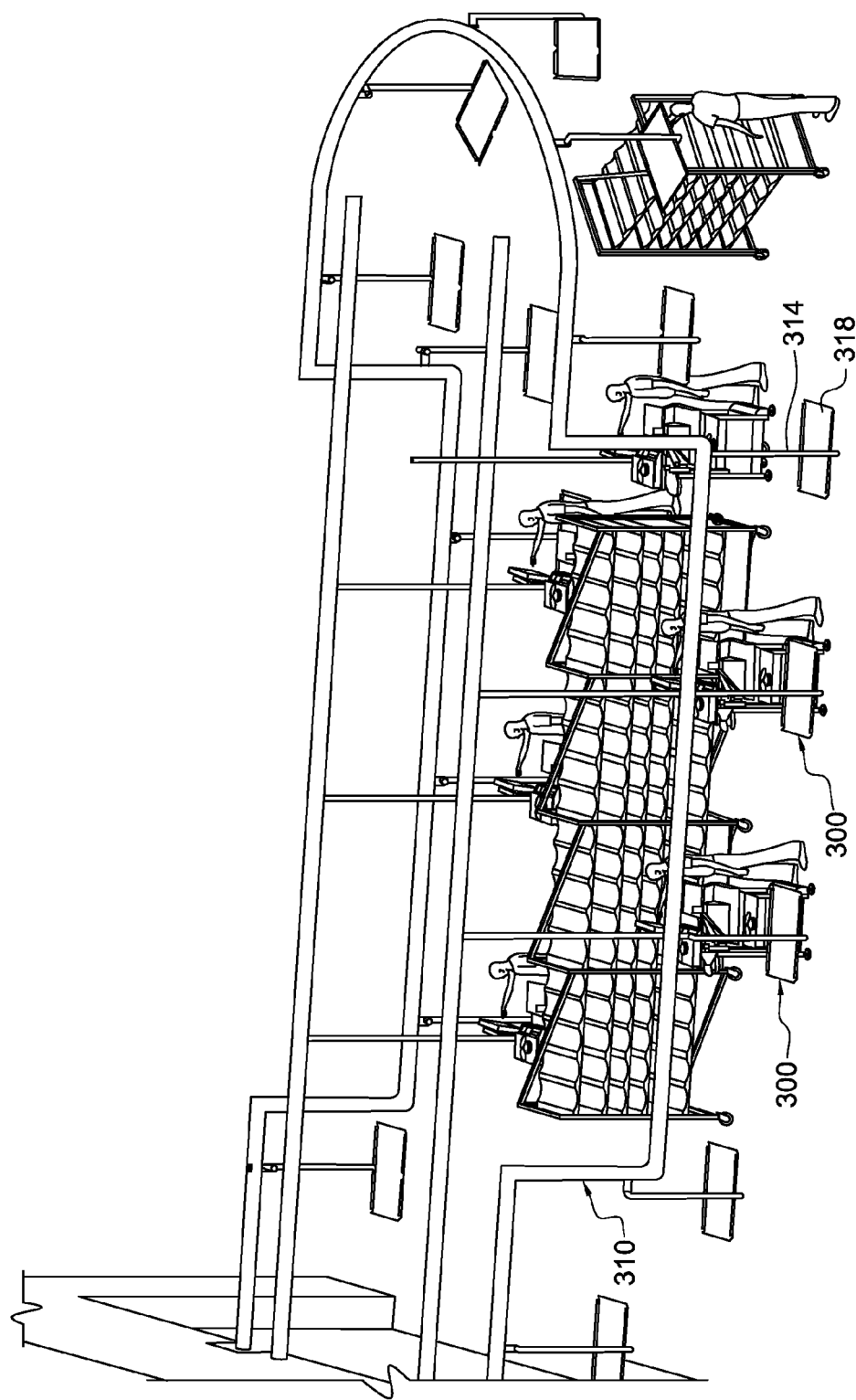
FIG. 19 is a top perspective view of another docking station system including an overhead tray conveyor system in use with six of the docking workstations according to the invention, such as shown in the embodiment of FIG. 18.

FIG. 18 shows another embodiment of a single work station 300 according to the invention may include touch screen 174 and weigh station 188 and rollable, lockable, movable piece of delicatessen equipment 304. Docking station 300 may be used, for example, with docking station 160 of the embodiment of FIG. 14 and, indeed, may be used in addition to or instead of one or more of docking stations 162, 164, 166, and 168. That is, when docking station 300 is used in conjunction with docking station 160 of FIG. 14, the user may undock docking station 162 by moving docking station 162 in the direction of double-headed arrow 190 as shown in FIG. 14. Namely, the user would move in the direction of the left arrow head of double-headed arrow 190; i.e. moved downwardly to the left as viewed in FIG. 14 and away from the remainder of docking station 160. Then, the docking station unit 300 of FIG. 18 may be moved into position adjacent the remaining ones of docking stations 164, 166, and 168. For example, in between docking station 164 and 166, as shown in FIG. 14 after docking station 162 has been moved away from its place as shown in FIG. 14. FIG. 19 illustrates six different docking stations 300 shown in position adjacent one another and adjacent a conveyor system 310 for moving loaded trays of prepared material in a food service industry layout, such as in a grocery store which takes orders for delicatessen sandwiches, prepares the order requested by the customer, and has the order finished, priced, and returned to the customer area of the store for pick-up and purchase by the customer. Stations 300 may be locked in position. Conveyor system 310 may include a number of arms 314 for holding a tray or tray receiving platform 318 movable into place next to an operator using one of docking stations 300 and, when the user is finished with the product to be loaded onto tray 318, the user will send tray 318 on to a further docking station 300 or still further on to the customer shopping area in the point-of-sale store, such as a grocery store. As shown, the equipment docking station may include conveyor system 310, and the piece of food service equipment, or one of the docking stations described herein, such as station 300 of FIGS. 18 and 19, is configured for being removably docked adjacent the conveyor.

Mobile units, such as carts, racks, tables, and equipment racks, such as for slicers for grocery stores and delicatessen may be used with the inventive system. Such mobile units may have retractable wheel systems or may be systems without retractable landing gear.

The lockable movable deli equipment may include a slicer such as Applicant's SZ5 brand Deli Buddy® Face to Face® brand Slicer Mounting System.

One embodiment according to the invention will be readily understood to be a table and/or cabinet that is designed to include an open section in the center, of sufficient size and free of structural elements so that a separate and standalone mobile piece of equipment such as a Deli Buddy® mobile retractable wheel slicer mounting system and or equivalent generic version of a mobile table can be docked. Deli Buddy® and Face to Face® are registered trademarks of M & E Manufacturing Co., Inc., Kingston, N.Y. A piece of deli equipment, such as a mobile slicer table may be in its docked position when the slicer or other piece of equipment is not required for its normal, intended, productive use. Alternatively, as shown in some embodiments, deli equipment may be in its undocked position when the deli equipment is in its use position.

When docked it may be stored facing away from the deli customer and towards a back wall, that is normally part of a deli layout. Then at such time as the deli becomes busy (such as those 8-10 hours a week of peak sales, i.e., Saturday at around noon) the deli will then "undock" the docked slicer and put it into to use in a butcher-facing-a-customer position. The "undocking" requires that the mobile table be removed from its docked position and rotated 180 degrees so the slicer can be used in a meat-cutter—(e.g., butcher)— facing-a-customer position manner.

The docking station will include provisions so that when the slicer or other mobile device is "undocked" the open space that is created can be converted to a work top by any number of means such as but not limited to:

A slide out work surfaces (stainless steel or cutting board material);

Hinged flip top wings that can be rotated 180 degrees from the left and right side of the open space;

Hinged flip top wings that can be rotated 90 degrees from the rear of the open space; and Portable detached panels.

The docking station can be constructed as a cabinet enclosure and it is envisioned that the interior space may provide adjustable shelves and runners that allow food service trays to be stored there.

It is further envisioned that the docking station may be constructed so that one or more of the wings or zones are refrigerated for food preparation and storage.

When compared to the potential use of two (2) free standing tables one left (L) of the slicer table and one right (R) of the slicer table, this open center section table offers several important features/benefits which are:

Advantages of using the extra "Deli Buddy® Docking Station" include at least:

The continuity and aesthetics of the entire table/back bar appearance;

The slicer and or other portable equipment table will dock/lock in place;

The difference in work surface heights of the slicer and of the Left and Right section of the docking station will provide an ergonomically correct work center; and There will be an economic advantage in purchasing the entire unit vs. purchasing single components.

Additionally, for those customers that already utilize work tables and mobile equipment support devices, such as Deli Buddy® brand equipment, the user of the delicatessen docking station system according to the invention will:

Increase the number of slicers in use during peak sales periods (without requiring more slicers or more square footage in the deli);

Provide for ease of cleanability for one more slicer. The slicer mounting system, such as the SZ5 system of FIG. 5, provides the beam and saddle suspension system, complete with the slide out crumb tray. Cleanup is measurably faster and more efficient than is the case for slicers mounted on a conventional flat top table or cabinet. The docking slicer can also be moved/positioned so the cleaning is done over a floor drain;

Improve the sanitation of the work station, due to the ease of clean ability;

reduce handling of the slicer, due to the fact that the slicer does not have to be lifted to clean under it when using the docking station; and Be possible to configure (if desired) the docking station system so that it can be used more efficiently for the production of party trays and for catering food preparations.

The docking station system according to the invention will be readily understood to be capable of being wall mounted and thus have no out board legs.

The docking station system according to the invention will be readily understood to be provided as a "system" including mobile support devices, such as applicant's patented Deli Buddy brand slicer mounting system.

The docking station itself may be provided as a standalone device, as described herein.

A further embodiment according to the invention may include that the entire docking station is mobile.

A further embodiment according to the invention may include that the docking station is configured so that delis with smaller aisle widths enjoy the benefits of the system. This could be of particular benefit to delicatessens, such as in the U.S. and Europe, with layouts where the aisle size is an issue.

A further embodiment according to the invention may include modular components that can be incorporated into the docking station, as detailed herein. This allows the docking station system to be a platform (foundation) so that other components can be added as needed.

In this way the end user of the docking station would be able to configure the customized work station so that it can be used to:

Prepare food trays/party trays;
Do catering food preparation;
Slice weigh and wrap deli products;
Prepare raw meat products for preparation;
Used in bakeries as a cake decorating or production center; and
Used in produce departments to prepare produce.

The center of the docking station may include an open area or it can include a work surface that can either be at a lower level or raised level as compared to the left and right work surfaces as detailed herein.

Under table work surfaces and under table racks, that can be "parked" under the left and right sections of the docking station system or could be docked in the center section (especially the work top) are likewise contemplated as set forth herein.

The prep or preparation station of FIG. 5 includes applicant's patented "saddle and beam" suspension system in use in the center section.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A modular delicatessen food preparation equipment system, comprising:
   a) a delicatessen equipment docking station configured for receiving and docking a piece of delicatessen service equipment, the delicatessen docking station including a first and a second delicatessen work station, each being configured for being removably secured adjacent and facing each other;
   b) each of the first and a second delicatessen work stations including a respective work table having a work surface and a respective docking station including a respective docking unit configured for receiving a piece of delicatessen service equipment therein;
   c) a respective piece of delicatessen service equipment being provided, and the piece of delicatessen service equipment being configured for being removably docked in the docking unit;
   d) a data processor is provided;
   e) a computer is provided which includes the data processor;
   f) a respective display screen is provided on each one of the first and a second delicatessen work stations, the display screen is operatively connected to the data processor for transmitting and receiving data, so that delicatessen preparation data is received and sent by a user using the display screen;
   g) the delicatessen equipment docking station includes a conveyor system; and
   h) each one of the first and a second delicatessen work stations is configured for being removably docked adjacent the conveyor system.

2. Modular delicatessen food preparation equipment system as in claim 1, wherein:
   a) a respective one of the first and a second delicatessen work station docking units is provided adjacent to the work surface.

3. Modular delicatessen food preparation equipment system as in claim 1, wherein:
   a) a respective one of the first and a second delicatessen work station docking units is provided underneath the work surface.

4. Modular delicatessen food preparation equipment system as in claim 1, wherein:
   a) the food service equipment is lockable and is locked in place when received in the docking unit and is unlocked when being moved out of the docking unit of a respective one of the first and a second delicatessen work stations.

5. Modular delicatessen food preparation equipment system as in claim 4, wherein:
   a) the delicatessen equipment of a respective one of the first and a second delicatessen work stations includes a lockable wheel.

6. Modular delicatessen food preparation equipment system as in claim 4, wherein:
   a) a respective one of the first and a second delicatessen work stations includes a retractable wheel.

7. Modular delicatessen food preparation equipment system as in claim 6, wherein:
   a) a foot is provided on the respective ones of the first and a second delicatessen work stations service equipment; and
   b) the retractable wheel being sufficiently retractable so that when the wheel is in a retracted position the foot rests on a support surface; and
   c) when the retractable wheel is in an unretracted position, the retractable wheel extends sufficiently far away from the food service equipment so that the foot is moved away from a support surface and the respective one of the first and a second delicatessen work stations delicatessen service equipment is able to be moved relative to the support surface.

8. Modular delicatessen food preparation equipment system as in claim 1, wherein:
   a) the delicatessen docking station includes a third delicatessen work station configured for being removably secured adjacent and facing the first and a second delicatessen work stations.

9. Modular delicatessen food preparation equipment system as in claim 8, wherein:
   a) a data processor is provided; and
   b) a display screen is provided on the third delicatessen work station each one of the equipment docking station and the further equipment docking station, and the respective display screen is operatively connected to the data processor for transmitting and receiving data, so that food preparation data is received and sent by each user using the display screen on the respective equipment docking station and the further equipment docking station.

10. Modular delicatessen food preparation equipment system as in claim 8, wherein:
    a) a display screen is provided on the third delicatessen work station each one of the equipment docking station and the further equipment docking station, and the respective display screen is operatively connected to the data processor for transmitting and receiving data, so that food preparation data is received and sent by each user using the display screen on the respective equipment docking station and the further equipment docking station.

11. Modular delicatessen food preparation equipment system as in claim 2, wherein:
    a) the delicatessen docking station includes a third delicatessen work station configured for being removably secured adjacent and facing the respective first and second delicatessen work stations.

12. Modular delicatessen food preparation equipment system as in claim 8, wherein:
    a) the delicatessen docking station includes a fourth delicatessen work station configured for being removably secured adjacent and facing the respective first, second, and third delicatessen work stations.

13. A modular delicatessen food preparation equipment system, comprising:
    a) a delicatessen equipment docking station configured for receiving and docking a piece of delicatessen service equipment, the delicatessen docking station including a first and a second delicatessen work station, each being configured for being removably secured adjacent and facing each other;
    b) each of the first and a second delicatessen work stations including a respective work table having a work surface and a respective docking station including a respective docking unit configured for receiving a piece of delicatessen service equipment therein;
    c) a respective piece of delicatessen service equipment being provided, and the piece of delicatessen service equipment being configured for being removably docked in the docking unit;
    d) a data processor is provided;
    e) a computer is provided which includes the data processor; and
    f) a respective display screen is provided on each one of the first and a second delicatessen work stations, the display screen is operatively connected to the data processor for transmitting and receiving data, so that delicatessen preparation data is received and sent by a user using the display screen.

14. Modular delicatessen food preparation equipment system as in claim 13, wherein:
    a) the delicatessen docking station includes a third delicatessen work station configured for being removably secured adjacent and facing the respective first and second delicatessen work stations.

15. Modular delicatessen food preparation equipment system as in claim 14, wherein:
    a) the delicatessen docking station includes a fourth delicatessen work station configured for being removably secured adjacent and facing the respective first, second, and third delicatessen work stations.

* * * * *